Jan. 29, 1957  J. E. BAUGHMAN  2,779,283
CONNECTOR FOR SECURING INITIATOR ROCKET TO AN AERIAL VEHICLE
Filed July 15, 1953  3 Sheets-Sheet 1

DIRECTION OF FLIGHT

INVENTOR.
JOHN E. BAUGHMAN
BY
ATTORNEYS

Jan. 29, 1957  J. E. BAUGHMAN  2,779,283
CONNECTOR FOR SECURING INITIATOR ROCKET TO AN AERIAL VEHICLE
Filed July 15, 1953  3 Sheets-Sheet 2

INVENTOR.
JOHN E. BAUGHMAN
BY
C. D. O'Brien
Q. Baxter Warner
ATTORNEYS

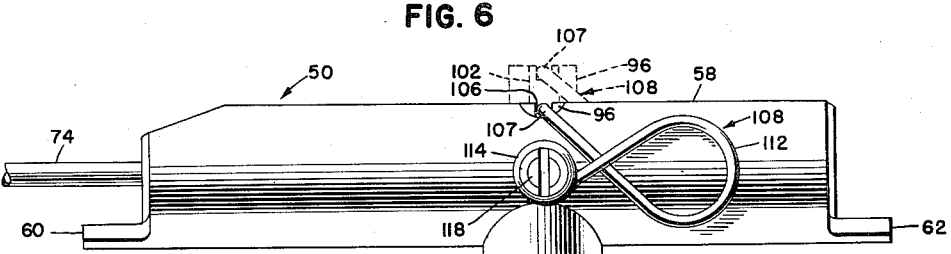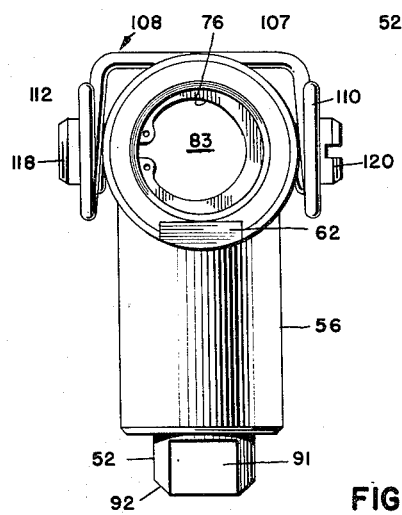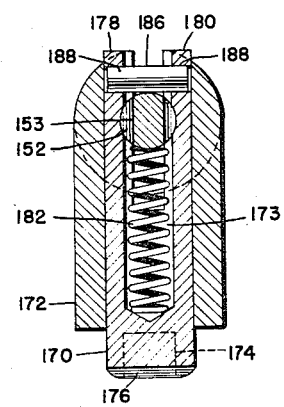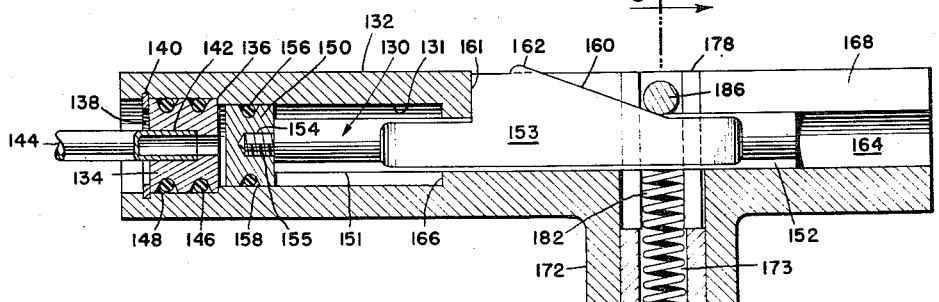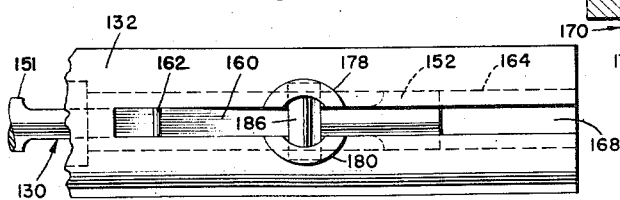

United States Patent Office 2,779,283
Patented Jan. 29, 1957

2,779,283

CONNECTOR FOR SECURING INITIATOR ROCKET TO AN AERIAL VEHICLE

John E. Baughman, West Hyattsville, Md., assignor to the United States of America as represented by the Secretary of the Navy Application July 15, 1953, Serial No. 368,083

15 Claims. (Cl. 102—49)

This invention relates to improvements in aerial vehicles and more particularly to an improved apparatus for releasably attaching a booster rocket to an aerial missile.

In the assisted take-off of an aerial vehicle, it is accepted practice to provide an auxiliary propulsion system or booster rocket to accelerate the vehicle to its operational speed. It is desirable that the booster rocket separate from the vehicle when the former's propelling force has been expended. Formerly, to releasably attach the booster rocket to the aerial vehicle, the booster rocket carried a fitting at its forward end which was inserted into a mating fitting at the tail end of the vehicle and was held there solely by the friction between the contacting surfaces of the two fittings. This type of union permitted separation of the booster rocket and the aerial vehicle in flight, after the thrust of the former was spent, so that the vehicle could be propelled by its sustainer rocket or similar propulsion system.

The lack of a rigid mechanical connection between the aerial vehicle and its booster rocket proved disadvantageous because of the possibility of premature separation, with damage resulting to both the vehicle and the rocket. The possibility of separation was particularly likely during the pre-flight handling of the assembly. For example, when the assembly of vehicle and booster rocket was being shifted into launching position on the launching platform it was inserted nose first onto the platform with stops provided on said platform engaging matching lugs on the booster rocket. The forward motion of the booster would be stopped abruptly when the lugs engaged the stops; however, the inertia of the aerial vehicle would cause it to continue in motion thereby disengaging the vehicle and the booster.

Accordingly, it is the principal object of the present invention to provide means for attaching a booster rocket to an aerial vehicle, which means will be automatically released when the assembled vehicle and booster rocket are in flight, thereby permitting separation of the vehicle and its booster when the propulsive force of the latter has been expended.

An additional object of the invention is to provide a mechanical connection between an aerial vehicle and its booster rocket which will permit separation of the booster and vehicle only after launching.

A further object of the invention resides in the provision of means by which the connection between an aerial vehicle and booster rocket can be quickly and easily effected and which, in addition, will dependably operate to permit the separation of the vehicle and booster only after the assembly has been launched.

It is also an object of the present invention to provide means for holding an aerial vehicle and its booster rocket in axial alignment during pre-flight handling.

Briefly, these and other objects which will become apparent hereinafter have been achieved by the provision of a latching device carried by a fitting on the booster rocket and having a locking pawl adapted to engage a surface provided on a mating fitting on the tail of the aerial vehicle. The locking pawl is held in engagement with the surface on the vehicle tail fitting until the ignition of the booster rocket. The high pressure gases generated by the burning of the rocket propellant are utilized to retract the pawl. When the pawl is retracted, the vehicle and booster are releasably connected so that separation will occur after the booster is expanded.

Further objects and attendant advantages of this invention will become evident from the following detailed description, taken in conjunction with the accompanying drawings, in which:

Fig. 6 is an elevation of the latching device;

Fig. 7 is an end view thereof, looking from the right in Fig. 6;

Fig. 8 is a sectional view corresponding to Fig. 3, but showing a modified form of the latching device;

Fig. 9 is a sectional view on the plane 9—9 of Fig. 8; and

Fig. 10 is a fragmentary plan view of the modification shown in Fig. 8.

Figure 1:
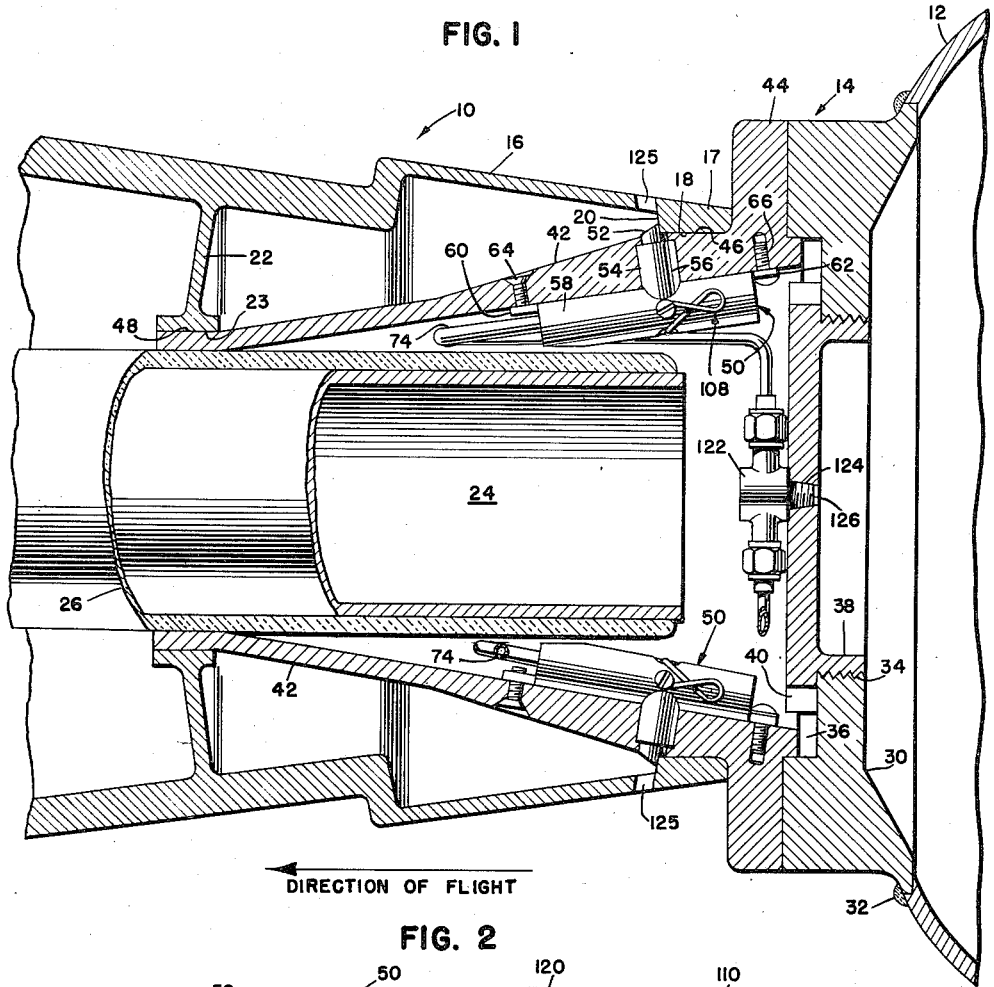
Fig. 1 is a fragmentary showing of a missile and a booster rocket in axial section with the latching means of this invention being shown in elevation.
Figure 2:
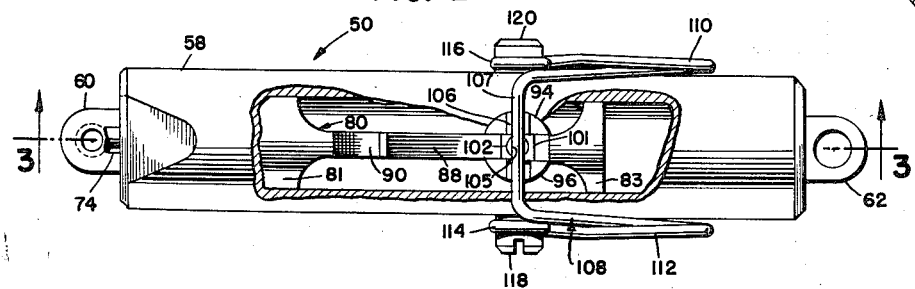
Fig. 2 is an enlarged plan view of the latching device, the housing of the latter being partly broken away and shown in section.

Referring to Fig. 1 of the drawing, the reference numeral 10 is applied generally to the tail structure of an aerial vehicle, for example, a guided missile of the ramjet type. A booster rocket 12, which is used to accelerate the missile to operating speed, is provided with a nose fitting, generally indicated by the reference numeral 14, that is adapted to be received in mating relationship with parts of a fitting provided in the tail structure 10 of the missile. The missile tail structure includes a stepped frusto-conical external shell 16, the aftermost bore of which has an internal flange 17 providing a cylindrical surface 18 and a shoulder 20. A web 22 carrying a cylindrical section 23 is also provided on the inside of the missile shell, spaced from the flange 17. The missile sustainer rocket extension tube 24 is housed within the missile tail 16, and a layer of heat insulation 26 is fitted about the tube 24. These parts of the missile tail structure 10 receive parts of the nose fitting 14 of the booster rocket 12 in a manner that will become clear hereinafter.

The forward end of the booster rocket 12 has a flanged ring 30 welded thereto as indicated at 32. The flanged ring 30 has internal threads 34 and is provided with a recess 36. A plug 38 having slots 40 to receive a spanner wrench or similar tool is screwed into the flanged ring 30. A generally frusto-conical section 42, adapted to be inserted into the bore in the missile tail structure 10, is provided with a flange 44 that abuts the flanged ring 30. The section 42 may be attached to the flanged ring 30 by screws (not shown) or in some other suitable manner and is provided with spaced cylindrical end portions 46 and 48 that contact the spaced cylindrical surfaces 18 and 23, respectively, provided internally of the missile shell 16 as hereinbefore described.

When the booster rocket 12 and the missile are assembled, the frusto-conical section 42 is inserted into the bore in the missile tail structure 10 with the flange 44 abutting the outer end of the flange 17, and the surfaces 46 and 48 bearing on the cylindrical surfaces 18 and 23, respectively, to hold the missile and booster in axial alignment.

A plurality of latching devices 50 are carried on the section 42 for holding the missile and its booster in assembled relationship. The latching devices 50 are mounted in spaced relationship on the inside surface of the section 42 adjacent its inner end. While two diametrically opposite latching devices are shown, it will be understood that any suitable number may be provided. The latching devices 50 include locking pawls 52 which extend through the wall of the section 42 and protrude beyond the surface of said section to engage the shoulder 20 of the flange 17. The section 42 is apertured as shown at 54 to receive a cylindrical guide 56 which is provided on the housing 58 of the latching device 50 to accommodate the locking pawl 52. The housing 58 is provided with a pair of mounting brackets 60 and 62, and screws 64 and 66 are employed to mount the latching devices on the section 42.

The details of the construction of a typical latching device 50 are shown in Figs. 2 to 7, inclusive. The body of the housing 58 is cylindrical, one end thereof being provided with an aperture 68 and a conical seat 70 which receives the flared end 72 of a pressure line 74. The other end of the cylindrical housing 58 is open and a snap ring 76 is inserted in a groove 78 formed on the inside surface of the housing, adjacent said open end.

A piston 80 is slidably disposed in the cylindrical housing 58. The piston 80 comprises cylindrical end portions 81 and 83, and a reduced intermediate portion forming a web 86. The forward end 81 is formed with a plurality of annular grooves 82 which carry O-rings 84 for sealing purposes. An inclined camming surface 88 is formed on the web 86 and a semi-circular detent receiving recess 90 is provided adjacent the upper end of the camming surface.

Figure 3:
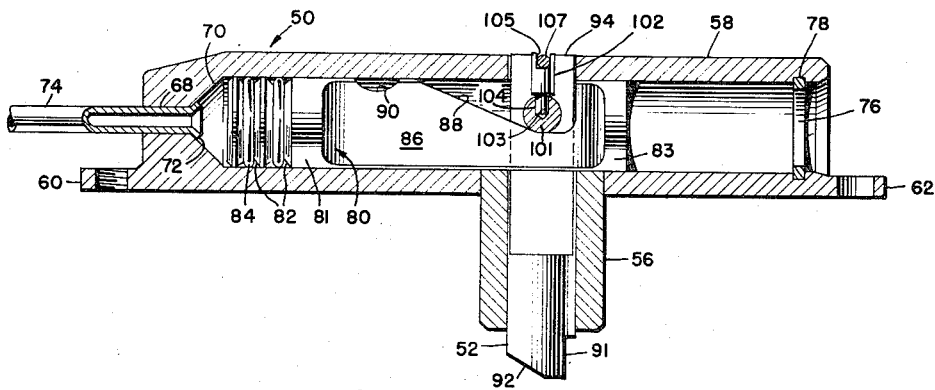
Fig. 3 is a sectional view on line 3—3 of Fig. 2 with the locking pawl in its extended position, parts being shown in elevation.
Figure 4:
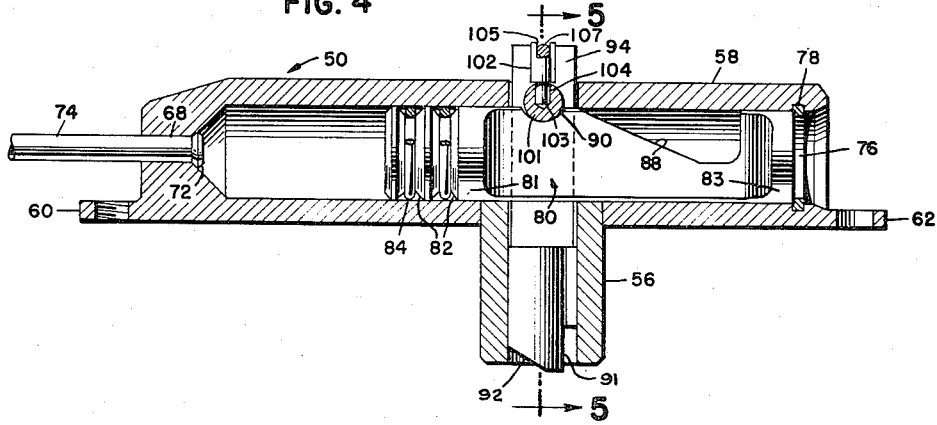
Fig. 4 is a view similar to Fig. 3, but showing the pawl in its retracted position.
Figure 5:
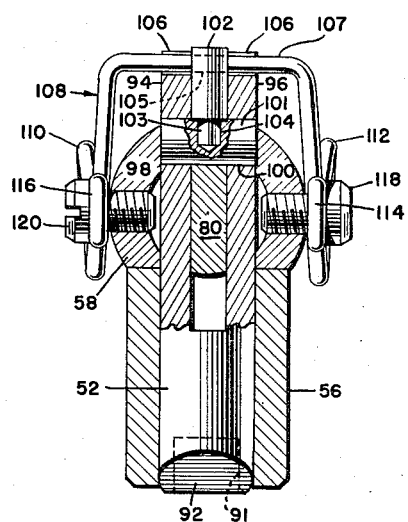
Fig. 5 is a sectional view on the line 5—5 of Fig. 4.

A locking pawl 52, which is slidably mounted in the guide 56 on the housing 58, is notched as shown at 91 to engage the shoulder 20 of the flange 17. The lower end surface 92 (as seen in Figs. 3 and 4) of the locking pawl 52 is beveled so that the pawl will be urged into the guide 56 upon contact with the flange 17 as the section 42 is inserted into the bore in the missile tail structure 10. The locking pawl 52 is bifurcated from substantially its mid-portion to its upper end thereby providing spaced legs 94 and 96 which straddle the web portion 86 of the piston 80. Apertures 98 and 100 are provided in the spaced legs 94 and 96, respectively, to receive a cylindrical cam follower 101.

A pin 102, carried between the upper end portions of the legs and having a reduced lower end portion 103 received in an aperture 104 in the cam follower 101, serves to prevent lateral motion of said cam follower in the apertures 98 and 100. The upper end of the pin 102 has a notch 105 which is aligned with similar notches 106 provided in the upper ends of legs 94 and 96 of the pawl 52. For yieldably urging the pawl 52 into its extended position, the bight portion 107 of a tension spring 108 is received in the aligned notches 105 and 106. The tension spring 108 has spaced loops 110 and 112, one of which is positioned on each side of the cylindrical housing 58. Hooks 114 and 116 provided at the ends of the spring are fastened under the heads of screws 118 and 120, respectively, which are inserted into opposite sides of the housing 58, for mounting the spring.

The pressure line 74, which communicates with the interior of the cylindrical housing 58 ahead of the piston 80, has its other end connected to an arm of a T-fitting 122 (Fig. 1). The T-fitting 122 is provided with a threaded nipple 124 which is screwed into a suitably threaded aperture 126 provided in the plug 38. It will be understood that the other arm of T-fitting 122 is connected in similar fashion by a second pressure line 74 to the interior of the cylindrical housing 58 of a second latching device 50.

The operation of the invention will now be briefly described. As previously described, the forward end of the booster rocket 12 is engaged in the tail structure 10 with the locking pawls 52 engaging the shoulders 20 of the flange 17. The end portion 48 will engage the section 23 and will cooperate with the flange 17 and end portion 46 to maintain the booster rocket and the missile in axial alignment.

When the booster rocket propellant is ignited at launching, gases having pressures of the order of a thousand pounds per square inch are developed in said booster rocket. These gases are conducted through the pressure lines 74 to the housings 58 where they act on the faces of the pistons 80. The pistons are moved rearwardly in the housings 58, and as they do, the cam followers 101 move along the inclined cam surfaces 88 and into the recesses 90, thereby retracting the locking pawls 52. separation of the booster rocket and the missile after the thrust of the booster is spent will thus be permitted. Openings 125 are arranged in the missile shell to permit the insertion of a suitable tool for contacting the pawl 52 for manual release of the latching means in the event that such release is desired, for making adjustments or repairs, prior to missile launching.

The modification of the invention shown in Figs. 8, 9 and 10 pertains to the latching device per se. In these views a piston 130 is slidably mounted in a cylinder 131 in substantially cylindrical housing 132. One end of the housing is closed by a plug 134 that is held in abutting relationship with a shoulder 136 on the inside of the housing by a snap ring 138 disposed in a groove 140 in the wall of the housing. The plug 134 has a bore 142 which receives the end of a pressure line 144, similar to the line 74, that is secured in the bore in any suitable manner. O-rings 146 are disposed in annular grooves 148 provided on the plug 134.

The piston 130 includes a piston element 150, a body including cylindrical end portions 151 and 152, and an intermediate web portion 153. The element 150 is provided with a threaded aperture 154 so that it can be screwed on a threaded shank 155 on the portion 151. An O-ring 156 is disposed in an annular groove 158 on the element 150. The upper surface of web 153 is shaped to define an inclined camming surface 160 and a stop 162. The piston 130 thus formed is arranged for sliding motion in a reduced bore 164 in the housing 132, a slot 168 being provided in the housing to accommodate the inclined camming surface 160 and the stop 162. The motion of the piston in one direction is limited by the shoulder 161, and in the other direction by a shoulder 166 at the inner end of the cylinder 131.

A locking pawl 170, generally similar to the pawl 52, is disposed for sliding motion in a guide 172 which extends at a right angle to the housing 132 and is formed integral therewith. The pawl 170 has a flattened face 174, a beveled end surface 176, and an axial bore 173 extending throughout the major portion of its length. The pawl is slotted throughout the upper half of its length to define arcuate legs 178 and 180 which straddle the web portion 153 of the piston 130. A helical compression spring 182 is interposed between the pawl 170 and the under surface of the piston web 153, the spring being retained in the bore 173 provided in the pawl 170. A cylindrical cam follower 186 is mounted on the upper end of the pawl and disposed across the slot above the piston 130, said follower being received in suitable apertures 188 provided in the legs 178 and 180.

The operation of this embodiment of the invention during the assembly process is substantially the same as that of the first described modification. The pressure line 144 is connected to the T-fitting on the booster rocket. After assembly of the booster rocket and the missile, in axial alignment, the locking pawls 170 are urged into their outermost position behind the shoulder 20 of flange 17 by the spring 182, thereby preventing separation of said booster rocket and missile. At the time of launching, the gases developed in the booster rocket are applied to the head 150 of the piston 130. As the piston 130 moves to its rearmost position in Fig. 8, the cam follower 186 moves along the camming surface 160 and engages the stop 162 thereby retracting pawl 170, so that separation of the missile and booster rocket is possible when the latter is spent. The stop 162 will, of course, prevent return movement of the piston 130 and consequent re-engagement of the pawl upon cessation of gas flow through the line 144.

Obviously many other modifications and variations of the present invention are possible in the light of the above teachings. It is therefore to be understood that within the scope of the appended claims the invention may be practiced otherwise than as specifically described.

What is claimed is:

1. In combination with an aerial vehicle having a tail section and a first fitting adjacent thereto, and a booster rocket having a second fitting, said fittings being engagable in mating relationship, means including a latching device for releasably connecting said fittings together and means operable by gases generated upon the ignition of said booster rocket for releasing said latching device.

2. In combination with an aerial vehicle and a booster rocket for said vehicle, means for releasably connecting the booster rocket to the aerial vehicle comprising, a first fitting carried adjacent the nose of said booster rocket, a second fitting carried adjacent the tail of said aerial vehicle, said first and second fittings being engaged in mating relationship, means carried on said fittings for latching the fittings in mating relationship, and means operable by gases generated upon the ignition of said booster rocket for releasing said latching means.

3. In combination with an aerial vehicle and a booster rocket for said vehicle, means for releasably connecting the booster rocket to the aerial vehicle comprising, a first fitting carried adjacent the nose of said booster rocket, a second fitting carried adjacent the tail of said aerial vehicle, said first and second fittings being joined in mating relationship, cooperating means carried on said fittings for latching the fittings in mating relationship, said cooperating means including a latch on said first fitting for engaging a portion of said second fitting, and means operable by the gases generated upon the ignition of said booster rocket for releasing said latch.

4. In combination with an aerial vehicle and a booster rocket for said vehicle, means for releasably connecting the booster rocket to the aerial vehicle comprising, a first fitting carried adjacent the nose of said booster rocket, a second fitting carried adjacent the tail of said aerial vehicle, said first and second fittings being joined in mating relationship, cooperating means carried on said fittings for latching said fittings in mating relationship, said cooperating means including a latch on said first fitting and means on said second fitting adapted to be engaged by said latch, and means operable by the gases generated upon the ignition of said booster rocket for releasing said latch.

5. In combination with an aerial vehicle and a booster rocket for said vehicle, means for releasably connecting the booster rocket to the aerial vehicle comprising, a first fitting carried adjacent the nose of said booster rocket, a second fitting carried adjacent the tail of said aerial vehicle, said first fitting being inserted into said second fitting in mating relationship therewith, cooperating means carried on said fittings for latching said fittings in mating relationship, and means operable by the gases generated upon the ignition of said booster rocket for releasing said latching means.

6. In combination with an aerial vehicle and a booster rocket for said vehicle, means for releasably connecting the booster rocket to the aerial vehicle comprising, a first fitting adjacent the tail of said aerial vehicle, said fitting including a bore provided with spaced members projecting thereinto, a second fitting carried adjacent the nose of said booster rocket, said second fitting having a section extending forwardly from the nose of said booster rocket and adapted to be inserted into the bore provided in said first fitting, said forwardly extending portion being adapted to contact the spaced members projecting into said bore whereby said booster rocket and said vehicle will be held in aligned relationship, latching means carried on said forwardly extending portion for engaging one of the members projecting into said bore, and means operable by the gases generated upon the ignition of said booster rocket for disengaging said latching means and said one of the members.

7. In combination with an aerial vehicle and a booster rocket for said vehicle, means for releasably connecting the booster rocket to the aerial vehicle comprising, a first fitting carried adjacent the nose of said booster rocket, said first fitting including a forwardly projecting portion, a second fitting carried adjacent the tail of said aerial vehicle for receiving said forwardly projecting portion, said second fitting including a bore in the tail of said vehicle, said bore being provided with a flange on its inside surface, latching means carried on said forwardly projecting portion for engaging said flange when said forwardly projecting portion is received in said bore, and means operable by the gases generated upon the ignition of said booster rocket for disengaging said latching means and said flange.

8. In combination with an aerial vehicle and a booster rocket for said vehicle, means for releasably connecting the booster rocket to the aerial vehicle comprising, a first fitting carried adjacent the nose of said booster rocket, said first fitting including a forwardly projecting portion, a second fitting carried adjacent the tail of said aerial vehicle for receiving said forwardly projecting portion, said second fitting including a bore in the tail of said vehicle, said bore being provided with a flange on its inside surface, a locking pawl carried on said forwardly projecting portion, means for urging said locking pawl into engagement with said flange when said forwardly projecting portion is in said bore, and means operable by the gases generated upon the ignition of said booster rocket for disengaging said locking pawl and said flange.

9. In combination with an aerial vehicle and a booster rocket for said vehicle, means for releasably connecting the booster rocket to the aerial vehicle comprising, a first fitting carried adjacent the nose of said booster rocket, said first fitting including a forwardly projecting portion, a second fitting carried adjacent the tail of said aerial vehicle for receiving said forwardly projecting portion, said second fitting including a bore in the tail of said vehicle, said bore being provided with a flange on its inside surface, a housing carried on said forwardly projecting portion, a locking pawl slidably mounted in said housing, means for urging said locking pawl into engagement with said flange when said forwardly projecting portion is received in said bore, and means operable by the gases generated upon the ignition of said booster rocket for disengaging said locking pawl and said flange.

10. In combination with an aerial vehicle for a booster rocket for said vehicle, means for releasably connecting the booster rocket to the aerial vehicle comprising, a first fitting carried adjacent the nose of said booster rocket, said first fitting including a forwardly projecting portion, a second fitting carried adjacent the tail of said aerial vehicle for receiving said forwardly projecting portion, said second fitting including a bore in the tail of said vehicle, said bore being provided with a flange on its inside surface, a housing carried on said forwardly projecting portion, a locking pawl slidably mounted in said housing, means for yieldably urging said locking pawl into engagement with said flange when said forwardly projecting portion is received in said bore, and a piston movably mounted in said housing, said piston being adapted to be moved by the high pressure gases developed upon the ignition of said booster rocket for disengaging said locking pawl and said flange.

11. In combination with an aerial vehicle and a booster rocket for said vehicle, means for releasably connecting the booster rocket to the aerial vehicle comprising, a first fitting carried adjacent the nose of said booster rocket, said first fitting including a forwardly projecting portion, a second fitting carried adjacent the tail of said aerial vehicle for receiving said forwardly projecting portion, said second fitting including a bore in the tail of said vehicle, said bore being provided with a flange on its inside surface, a housing carried on said forwardly projecting portion, a locking pawl slidably mounted in said housing, spring means for yieldably urging said locking pawl into engagement with said flange when said forwardly projecting portion is received in said bore, a cam follower carried on said pawl, a piston movably mounted in said housing, said piston having a camming surface adapted to be contacted by said cam follower for forcing said pawl out of engagement with said flange against the action of said spring means, and means for applying the high pressure gases developed upon the ignition of said booster rocket to said piston for moving said piston.

12. Apparatus as claimed in claim 11 wherein the spring means comprises a tension spring acting on said pawl.

13. Apparatus as claimed in claim 12 wherein the spring means comprises a compression spring interposed between said piston and said locking pawl.

14. In combination with an aerial vehicle and a booster rocket for said vehicle, means for releasably connecting the booster rocket to the aerial vehicle comprising, a first fitting carried adjacent the nose of said booster rocket, said first fitting including a forwardly projecting portion, a second fitting carried adjacent the tail of said aerial vehicle for receiving said forwardly projecting portion, said second fitting including a bore in the tail of said vehicle, said bore being provided with a flange on its inside surface, a housing carried on said forwardly projecting portion, a guide projecting from said housing, a locking pawl slidably carried in said guide, means yieldably urging said pawl into engagement with said flange when said forwardly projecting portion is inserted into said bore, a cam follower on said pawl, a piston movably mounted in said housing, said piston having a cam surface adapted to be contacted by said follower for disengaging said pawl and said flange, and means for applying the high pressure gases developed upon the ignition of said booster rocket to said piston for moving the latter.

15. A latching device comprising a housing, a guide extending from said housing, a locking pawl slidably carried in said guide and adapted to project beyond said guide in locking position, said locking pawl being provided with a slot, a spring urging said locking pawl into locking position, a piston slidably disposed in said housing for retracting said locking pawl, said piston including a reduced portion slidably received in the slot in said pawl, said reduced portion having an inclined camming surface, a cam follower carried on said pawl in contact with said inclined camming surface and means for supplying gas under pressure to said piston to move the piston whereby the pawl will be retracted as said cam follower moves along said inclined camming surface.

References Cited in the file of this patent

UNITED STATES PATENTS 1,070,885     Gentile _____ Aug. 19, 1913

FOREIGN PATENTS 6,781     Great Britain _____ of 1914